US008680978B2

(12) United States Patent
Yang et al.

(10) Patent No.: US 8,680,978 B2
(45) Date of Patent: Mar. 25, 2014

(54) METHOD FOR DISPLAYING A WARNING MESSAGE IN A VEHICLE

(75) Inventors: Yiwen Yang, Hildesheim (DE); Lutz Bersiner, Hildesheim (DE); Mario Mueller-Frahm, Hannover (DE); Moez Selem, Hannover (DE); Peter Vogel, Hildesheim (DE); Gerrit De Boer, Hildesheim (DE); Andreas Engelsberg, Hildesheim (DE); Holger Modler, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 234 days.

(21) Appl. No.: 13/122,077

(22) PCT Filed: Sep. 14, 2009

(86) PCT No.: PCT/EP2009/061836
§ 371 (c)(1),
(2), (4) Date: Jun. 21, 2011

(87) PCT Pub. No.: WO2010/037625
PCT Pub. Date: Apr. 8, 2010

(65) Prior Publication Data
US 2011/0248842 A1    Oct. 13, 2011

(30) Foreign Application Priority Data
Oct. 1, 2008    (DE) .......................... 10 2008 042 539

(51) Int. Cl.
*B60Q 1/00*    (2006.01)
*G08G 1/16*    (2006.01)
*G01C 1/00*    (2006.01)

(52) U.S. Cl.
USPC ........... 340/435; 340/436; 340/903; 701/400; 701/408; 701/415

(58) Field of Classification Search
USPC ........... 340/435, 436, 903; 701/400, 408, 415
See application file for complete search history.

(56) References Cited

U.S. PATENT DOCUMENTS 6,615,137 B2 * 9/2003 Lutter et al. ................... 701/301
6,662,108 B2 * 12/2003 Miller et al. .................. 701/301
(Continued)

FOREIGN PATENT DOCUMENTS

| CN | 1163442 A | 10/1997 |
| CN | 1627915 A | 6/2005 |
| CN | 1629930 A | 6/2005 |
| CN | 201047995 Y | 4/2008 |

(Continued)

OTHER PUBLICATIONS

International Search Report corresponding to PCT Application No. PCT/EP2009/061836, mailed May 10, 2010 (8 pages).

*Primary Examiner* — George Bugg
*Assistant Examiner* — Munear Akki
(74) *Attorney, Agent, or Firm* — Maginot, Moore & Beck

(57) ABSTRACT

A method for displaying a warning message in a first vehicle, includes transmitting from a second vehicle a warning and position data relating to a position of the second vehicle to the first vehicle, wherein if, after reception of the warning and of the position data by the first vehicle, it is concluded on the basis of the received position data that the second vehicle can be seen by a driver of the first vehicle in a region of a head-up display of the first vehicle, the warning message is displayed in such a way that the second vehicle is characterized visually for the driver of the first vehicle in the head-up display of the first vehicle.

10 Claims, 2 Drawing Sheets

(56) References Cited

U.S. PATENT DOCUMENTS

| | | | |
|---|---|---|---|
| 6,844,826 B2* | 1/2005 | Yurimoto et al. | 340/988 |
| 7,015,876 B1* | 3/2006 | Miller | 345/7 |
| 7,382,274 B1* | 6/2008 | Kermani et al. | 340/901 |
| 8,330,620 B2* | 12/2012 | Swoboda et al. | 340/902 |
| 2006/0173611 A1* | 8/2006 | Takagi et al. | 701/204 |
| 2007/0106475 A1 | 5/2007 | Kondoh | |
| 2009/0225434 A1* | 9/2009 | Nicholas et al. | 359/630 |

FOREIGN PATENT DOCUMENTS

| | | |
|---|---|---|
| DE | 19730791 | 1/1999 |
| DE | 10126618 | 12/2002 |
| DE | 102005055208 | 2/2007 |
| DE | 102005042912 | 3/2007 |
| EP | 0927983 | 7/1999 |
| EP | 1783531 | 5/2007 |
| WO | 2003005102 | 1/2003 |

* cited by examiner

METHOD FOR DISPLAYING A WARNING MESSAGE IN A VEHICLE

This application is a 35 U.S.C.§371 National Stage Application of PCT/EP2009/061836, filed Sep. 14, 2009, which claims the benefit of priority to Ser. No. 10 2008 0420539.7, filed Oct. 1, 2008 in Germany, the disclosures of which are incorporated herein by reference in their entirety.

BACKGROUND

The disclosure is based on a method and a control device of the generic type of the independent claims.

Display units in vehicles which make information visible to a driver of a motor vehicle in a region of a front windshield of the motor vehicle are known. Such display systems are also referred to as head-up displays.

EP 0927983 B1 discloses a device for warning a driver of a motor vehicle, in which device different motor vehicles which are participating in the road traffic exchange data with one another via respective communication units. It is known here that a motor vehicle has data from another motor vehicle transmitted to it, the data containing a warning.

SUMMARY

In contrast with the above, the method according to the disclosure has the advantage that a warning message relating to a warning which has been transmitted from a second vehicle to the first vehicle is displayed to a driver of a first vehicle in such a way that the second vehicle is characterized visually for the driver of the first vehicle in a head-up display of the first vehicle. This is advantageous in particular since the other vehicle to which a warning message relates is thus indicated to the driver of the first vehicle in an easily perceptible fashion. In accordance with the method according to the disclosure, the second vehicle transmits a warning and position data relating to its position to the first vehicle. After the warning and the position data have been received by the first vehicle, it is concluded, on the basis of received position data of the second vehicle, whether the second vehicle can be seen by the driver of the first vehicle in a region of a head-up display of the first vehicle. If this is the case, the warning message is characterized visually for the driver of the first vehicle by characterizing the second vehicle in the head-up display and/or in the region of the head-up display of the first vehicle.

Advantageous developments and improvements of the method disclosed in the independent claim are made possible by the measures specified in the dependent claims.

According to a further embodiment of the disclosure, in addition to the position data, it is concluded on the basis of surroundings-sensing data of a surroundings-sensing unit of the first vehicle whether the second vehicle can be seen by the driver of the first vehicle in the region of the head-up display. This has the advantage that additionally taking into account the surroundings-sensing data permits a more precise or more reliable decision to be taken as to whether and in which region of the head-up display the second vehicle can be seen by the driver of the first vehicle.

According to a further embodiment of the disclosure, the viewing direction of the driver of the first vehicle is additionally inferred on the basis of image data of an image-sensing unit of the first vehicle. The viewing direction is preferably used as an input variable or calculation variable in order to determine the region of the head-up display in which the second vehicle is to be characterized visually for the driver of the first vehicle. This has the advantage that the region of the head-up display in which the second vehicle is characterized visually is selected adapted as a function of the possibly changing viewing direction of the driver of the first vehicle.

According to a further embodiment of the disclosure, the visual characterization is effected on the basis of a warning color. This has the advantage that the driver is intuitively alerted to a warning message since it is obvious to a driver to associate a warning message with a warning color. A warning color is a color with a restricted color spectrum which preferably predominantly has red components. Colors in the region of the color spectrum which can be classified as red or as orange are preferably used as warning colors.

According to a further embodiment of the disclosure, the warning from the second vehicle contains classification data on the basis of which it is decided whether the warning message is to be displayed to the head-up display of the first vehicle. This is therefore advantageous since such warnings which are intended to lead directly to the outputting or displaying of a warning message on the head-up display can easily be differentiated on the basis of the classification data. Many warnings are possibly highly important and should therefore be displayed immediately. Other warnings are possibly less important so that it is possible not to display a warning message.

According to one further embodiment of the disclosure, the warning message also contains a time information item on the basis of which it is possible to decide whether the warning message is to be displayed in the head-up display. This is advantageous since different received warnings which are received at different times can be used to determine, on the basis of the time information item in the warning, whether a warning has already been received once or whether it is a new, different warning which is intended to lead to displaying of a new, further warning message. For this purpose, the warning preferably has as time information the time at which the warning was generated by the second vehicle.

According to a further embodiment of the disclosure, the warning message is displayed by additionally displaying at least one further warning information item in the head-up display. This is advantageous not only since the further warning information item indicates to the driver of the first vehicle the vehicle from which a warning originates but also since more precise information relating to the warning or the warning message can thus be presented.

According to the disclosure, a control device outputs a display signal for a head-up display, wherein the control device carries out the method according to the disclosure by means of different sub-devices of the control device. The control device according to the disclosure has the advantage that on the basis of displaying a warning message in the head-up display in such a way that the second vehicle is characterized visually for the driver of the first vehicle in the head-up display of the first vehicle, the control device actuates the head-up display by means of a display signal via a display in such a way that the driver of the first vehicle can easily be alerted to the second vehicle on the basis of the corresponding displaying of the warning message.

According to a further embodiment of the control device according to the disclosure, in addition to position data of the second vehicle, a computing unit of the control device concludes, on the basis of surroundings-sensing data of the surroundings-sensing unit, whether the second vehicle can be seen by the driver of the first vehicle in a region of the head-up display. This is advantageous since, by taking into account surroundings-sensing data of the surroundings-sensing unit, the computing unit can determine in a more precise way the region of the head-up display in which the warning message is to be displayed.

According to a further embodiment of the control device according to the disclosure, the control device has an interface to an image-sensing unit via which the computing unit of the control device receives image data. By means of the image data, the computing unit advantageously determines, on the basis of the viewing direction, the region of the head-up display in which the second vehicle is to characterized visually. This is advantageous since by additionally taking into account the viewing direction of the driver it is possible also to take into account a possible change in the region in which the second vehicle can be seen by the driver.

BRIEF DESCRIPTION OF THE DRAWINGS

Exemplary embodiments of the disclosure are illustrated in the drawings and explained in more detail in the following description. In said drawings.

DETAILED DESCRIPTION

Figure 1:
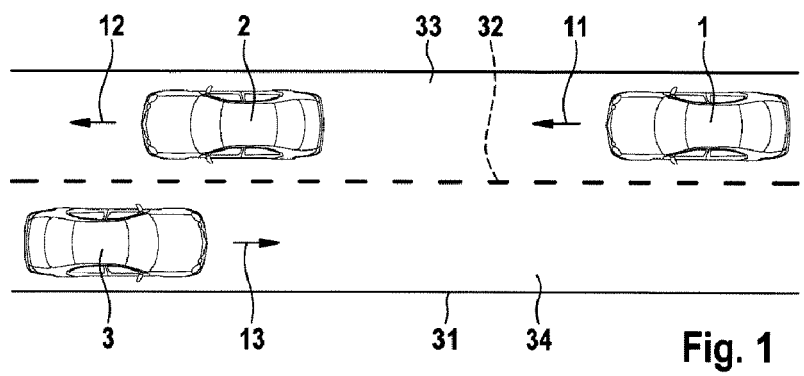
FIG. 1 shows a traffic situation with different vehicles.

FIG. 1 shows a traffic situation on a road 31 which is divided by a median strip 32 into two lanes 33, 34. On a first lane 33 there is a first vehicle 1 and a second vehicle 2, wherein the first vehicle 1 has a first travel direction 11, which corresponds to a second travel direction 12 of the second vehicle 2. On a second lane 34 there is a third vehicle 3, which has a third travel direction 13, which is opposed to the first travel direction 11 and the second travel direction 12. It is assumed that the first vehicle 1 and the second vehicle 2 each have communication units which are connected to one another in order to exchange data. Such communication units for what are referred to as car-to-car systems for transmitting messages from one vehicle to a further vehicle establish, for example, communication possibilities by means of what are referred to as ad-hoc networks. If, for example, a traffic situation which represents a critical situation arises for the second vehicle 2 or for the driver of the second vehicle 2, the communication unit of the second vehicle 2 transmits a warning to the communication unit of the first vehicle 1. Such a critical traffic situation can then occur for the driver of the second vehicle 2 when, for example, said driver is forced to brake due to further road users located in front of him. In this context, it is possible to determine through corresponding signals of, for example, an ABS (anti-lock brake system) that the negative acceleration of the vehicle which is brought about by the braking operation can be advantageous for making further motor vehicles following the second vehicle aware of such braking. A further critical traffic situation could then occur, for example, if, owing to a traffic situation which is in front of the driver of the second vehicle, said driver brings about, through strong steering movements, a situation in which the vehicle begins to skid. Such skidding can be detected, for example, on the basis of signals of an ESP system (electronic stability program) and can therefore be utilized to decide whether a warning is to be transmitted to further communication units of further motor vehicles via the communication unit of the second motor vehicle.

Figure 2:
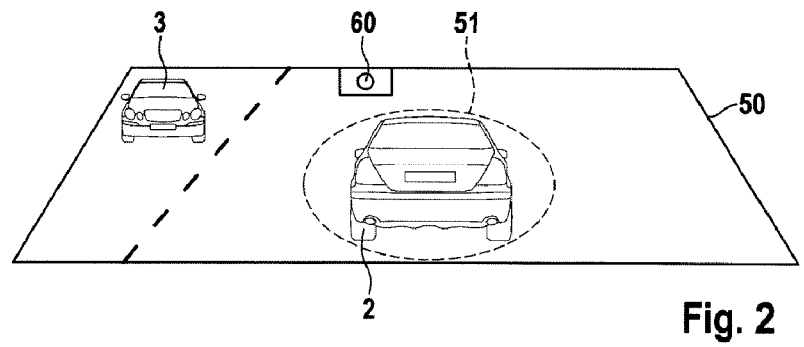
FIG. 2 shows characterization of a second vehicle in a head-up display of a first vehicle.

According to the disclosure there is provision that the communication unit of the second vehicle not only transmits a warning to the communication unit of a further vehicle but also transmits position data relating to the position of the second vehicle. If the first vehicle then receives a warning as well as position data of the second vehicle, an inventive display of a warning message can occur. After the warning and the position data have been received by the first vehicle, it is firstly inferred in the first vehicle whether the second vehicle can be seen by a driver of the first vehicle in a region of a head-up display of the first vehicle. For this purpose, FIG. 2 shows a front windshield 50 of the first vehicle 1 through which the driver sees, for example, the second vehicle 2 and the third vehicle 3. In addition it can also be seen that the regions in which the vehicles 2, 3 are located are separated by the median strip 32. Information is then displayed according to the disclosure on a front windshield of a motor vehicle by means of a head-up display in such a way that the second vehicle 2 is characterized visually for the driver of the first vehicle by means of a visual characterization 51, for example a circular dashed border. The differentiation, whether the second vehicle 2 or the third vehicle 3 is to be characterized visually for the driver of the first vehicle 1 in the head-up display or on the front windshield 50, can occur on the basis of the position data of the second vehicle 2. If the position data of the second vehicle 2 comprise, for example, data of a GPS system, preferably of a differential global positioning system (DGPS), it is possible to infer on the basis of the position data of the second vehicle 2 the position at which the second vehicle 2, which has transmitted the warning, is located. It is therefore possible to infer that the second vehicle 2, and not the third vehicle 3, is to be characterized visually. A transmission of the position data of the second vehicle 2 can additionally contain not only position data which represent a position of the second vehicle 2 at an individual point in time but also position data which describe a plurality of positions of the second vehicle 2 at different points in time. As a result, it is possible to infer a travel direction of the second vehicle 2. In addition, it is preferably possible to access position data of the first vehicle 1 by means of a position-determining unit in the first vehicle 1 in order preferably to obtain both position data of the first vehicle 1 and a travel direction of the first vehicle 1 and to use these to determine the region of the head-up display of the first vehicle 1 in which the second vehicle 2 can be seen by the driver of the first vehicle 1 and is to be characterized visually for said driver.

The first vehicle preferably additionally contains a surroundings-sensing unit. In addition to the position data of the second vehicle, it is additionally concluded, on the basis of surroundings-sensing data of the surroundings-sensing unit, that the second vehicle can be seen by the driver of the first vehicle in the region of the head-up display of the first vehicle. The surroundings-sensing unit is preferably here an image-generating unit, for example a camera, so that the surroundings-sensing data in such a case are, for example, image data. By additionally evaluating image data it is preferably possible to infer more precisely the region of the head-up display or of the front windshield 50 in which the second vehicle 2 can be seen by the driver of the first vehicle 1. In addition, the surroundings-sensing unit may be a radar unit, so that the surroundings-sensing data are radar signals. Likewise, surroundings-sensing units in the form of ultrasonic sound sensors and ultrasonic sound signal generators, which make available ultrasonic sound signals as surroundings-sensing data, are conceivable.

In the first vehicle there is preferably an image-sensing unit 60, as illustrated in FIG. 2, which is, for example, a camera.

Such an image-sensing unit 60 makes available image data, preferably video data, on the basis of which the viewing direction of the driver of the first vehicle 1 is inferred. The image-sensing unit 60 is preferably positioned in a central, upper region of the front windshield 50, preferably above a central rearview mirror. Evaluating image data which show the driver of the first vehicle therefore permits the viewing direction of the driver of the first vehicle to be inferred. The region of the head-up display in which the second vehicle is to be characterized visually for the driver, preferably by a characterization 51, is determined on the basis of the viewing direction which is therefore determined. Such a visual characterization 51 is preferably carried out on the basis of a warning color. In this way, the driver is easily alerted to the second vehicle which transmits the warning so that the driver of the first vehicle can intuitively direct his attention to the second vehicle, which constitutes a potential hazard.

Figure 3:
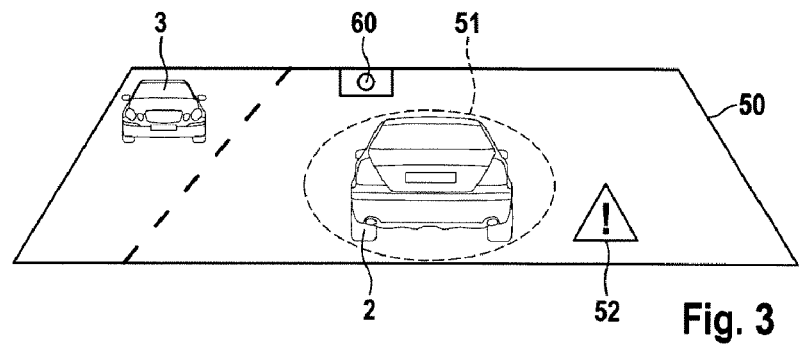
FIG. 3 shows additional outputting of a further warning information item in a head-up display of the first vehicle.

The warning of the second vehicle preferably additionally contains a further warning information item. In this respect, FIG. 3 shows all the objects illustrated in FIG. 2, with identical reference symbols, and additionally a further warning information item 52 which is, for example, an exclamation mark in a triangle. This further warning information item 52 is preferably indicated alone without the characterization 51 or in addition to the characterization 51 of the second vehicle, preferably next to the second characterization 51 or next to the vehicle 2 to be characterized. The further warning information item may be text information, a warning signal, a code to which a warning information item is assigned, or a data structure from which it is possible to infer what kind of warning information item is to be additionally displayed. The second vehicle 2 preferably transmits what is referred to as a warning code to the first vehicle 1 by means of a communication unit so that the further warning information item which is to be displayed is determined in the first vehicle 1 on the basis of a table, a list or some other form of stored data and by means of the warning code.

The warning preferably additionally contains classification data on the basis of which it is decided whether the warning message is to be displayed in the head-up display. If the second vehicle 2 transmits, for example, a warning relating to a moderate braking activity of the driver of the second vehicle, it is possible to decide in the first vehicle, on the basis of corresponding classification data in the warning, that the warning message is not to be output in the form of a characterization 51 of the second vehicle 2. This advantageously avoids a situation in which any form of warning message occurs in the form of characterizations of vehicles for any form of warning, which can result in sensory overload. If warning messages in the form of characterizations of other vehicles are displayed to the driver of the first vehicle 1 only when the warning has been classified as important on the basis of the classification data, this avoids the situation in which sensory overload of the driver of the first vehicle as a result of excessively frequent warning messages in the form of characterizations 51 means that the driver possibly no longer perceives this characterization 51.

The warning of the second vehicle preferably additionally contains a time information item on the basis of which it is decided whether the warning message is to be displayed in the head-up display. The time information item here is preferably what is referred to as a time stamp which indicates that point in time at which the warning was generated in the second vehicle 2. If a communication unit of the first vehicle 1 therefore receives the same warning repeatedly, for example owing to transmission disruptions during a radio transmission, at different times from the communication unit of the second vehicle 2, it is therefore possible to decide, for example in the first vehicle 1, on the basis of the time information item in the form of a time stamp, that the repeatedly received warning is the same warning so that renewed determination of the region in which the second vehicle 2 cannot be seen by the driver in the head-up display does not have to be carried out.

Figure 4:
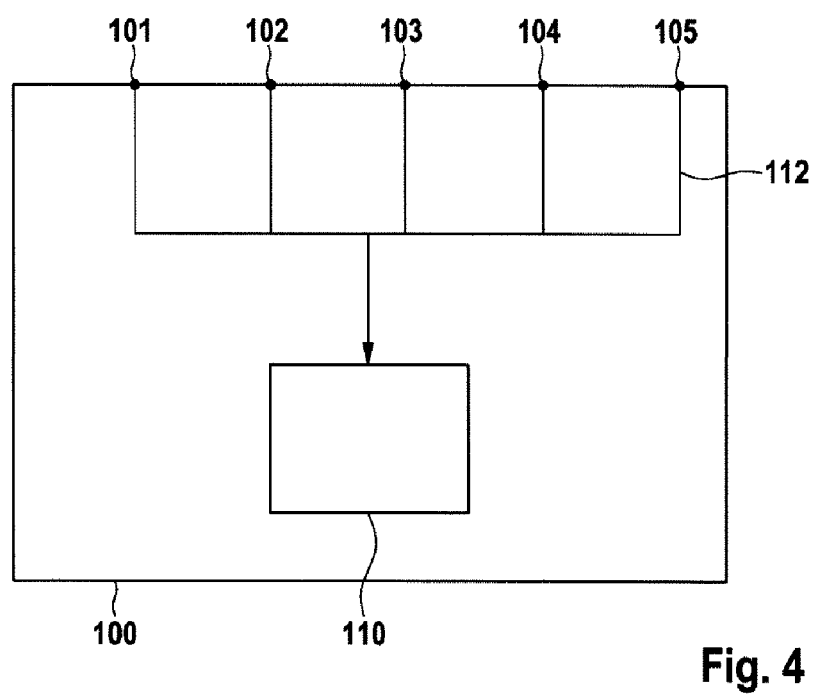
FIG. 4 shows an embodiment of a control device according to the disclosure.

FIG. 4 shows an embodiment of the control device according to the disclosure. The control device 100 has a first interface 101 for receiving a warning and position data from a second vehicle. Such an interface is, for example, an interface for the wireless transmission of data, for example a WLAN interface, or an interface to a receiver unit which is located outside the control device 100. The control device according to the disclosure additionally has a second interface 102 for outputting the display signal for a head-up display in a first vehicle. A warning message is displayed to a driver of the first vehicle in the head-up display by means of the display signal. The control device 100 according to the disclosure is characterized in that after reception of the warnings of the position data, a computing unit 110 concludes on the basis of the position data whether the second vehicle can be seen by the driver of the first vehicle 1 in a region of the head-up display of the first vehicle 1. The computing unit 110 is preferably connected to the first interface 101 and to the second interface 102 via a system for data communication 112, preferably a bus system. The communication or the transmission of different data, warnings, position data and display signals is possible via such a bus system 112. If the computing unit 110 concludes that the second vehicle 2 can be seen by the driver of the first vehicle in a region of the head-up display of the first vehicle 1, the computing unit 110 displays, by means of the display signal which is to be output, the warning message in the head-up display in such a way that the second vehicle 2 is characterized visually for the driver of the first vehicle 1 in the head-up display of the first vehicle 1.

The control device 100 preferably has a fifth interface 105 via which the control device 100 and/or the computing unit 110 receives position data relating to a position of the first vehicle. Such position data may be, for example, data of a GPS system.

The control device 100 preferably has a third interface 103 via which the control device 100 and/or the computing unit 110 receive surroundings-sensing data from a surroundings-sensing unit of the first vehicle. In addition to the position data of the second vehicle, the computing unit 100 concludes on the basis of the surroundings-sensing data, for example image data, whether the second vehicle 2 can be seen by the driver of the first vehicle 1 in a region of the head-up display of the first vehicle 1.

According to a further embodiment, the control device 100 has a fourth interface 104, via which the control device 100 and/or the computing unit 110 receive image data from an image-sensing unit of the first vehicle. On the basis of the image data, the computing unit 110 infers a viewing direction of the driver of the first vehicle 1. In addition, the computing unit 100 determines, on the basis of the viewing direction, the region of the head-up display in which the second vehicle 2 is to be characterized visually for the driver of the first vehicle 1.

The invention claimed is:

1. A method for displaying a warning message in a first vehicle, comprising:
transmitting from a second vehicle a warning and position data relating to a position of the second vehicle to the first vehicle,
wherein if, after reception of the warning and of the position data by the first vehicle, it is concluded on the basis of the received position data that the second vehicle can be seen by a driver of the first vehicle in a region of a head-up display of the first vehicle, the warning message is displayed in such a way that the second vehicle is characterized visually for the driver of the first vehicle in the head-up display of the first vehicle.

2. The method as claimed in claim 1, wherein, in addition to the position data, surroundings-sensing data of a surroundings-sensing unit of the first vehicle are used to conclude that the second vehicle can be seen by the driver of the first vehicle in the region of the head-up display of the first vehicle.

3. The method as claimed in claim 1, wherein:
a viewing direction of the driver of the first vehicle is inferred on the basis of image data of an image-sensing of the first vehicle, and
the region of the head-up display in which the second vehicle is characterized visually for the driver of the first vehicle is determined on the basis of the viewing direction.

4. The method as claimed in claim 1, wherein the visual characterization is effected on the basis of a warning color.

5. The method as claimed in claim 1, wherein the warning contains classification data on the basis of which it is decided whether the warning message is to be displayed in the head-up display.

6. The method as claimed in claim 1, wherein the warning additionally contains a time information item on the basis of which it is decided whether the warning message is to be displayed in the head-up display.

7. The method as claimed in claim 1, wherein the warning message is displayed in the head-up display by additionally displaying at least one further warning information item.

8. A control device for outputting a display signal for a head-up display in a first vehicle, comprising:
a first interface for receiving a warning signal and position data from a second vehicle,
a second interface for outputting the display signal to the head-up display; and
a computing unit,
wherein a warning message to a driver of the first vehicle is displayed in the head-up display by means of the display signal,
wherein after reception of the warning message and of the position data, the computing unit concludes on the basis of the position data whether the second vehicle can be seen by the driver of the first vehicle in a region of the head-up display of the first vehicle, and
wherein if the second vehicle can be seen by the driver of the first vehicle in the region of the head-up display of the first vehicle, the computing unit displays the warning message by means of the display signal to be output in the head-up display in such a way that the second vehicle is characterized visually for the driver of the first vehicle in the head-up display of the first vehicle.

9. The control device as claimed in claim 8, wherein the control device further comprises:
a third interface to a surroundings-sensing unit of the first vehicle, and
wherein, in addition to the position data, the computing unit concludes, on the basis of surroundings-sensing data of the surroundings-sensing unit, whether the second vehicle can be seen by the driver of the first vehicle in a region of the head-up display of the first vehicle.

10. The control device as claimed in claim 9, wherein the control device further comprises:
a fourth interface to an image-sensing unit,
wherein the computing unit infers a viewing direction of the driver on the basis of image data of the image-sensing unit, and
wherein the computing unit determines, on the basis of the viewing direction, the region of the head-up display in which the second vehicle is characterized visually for the driver.

\* \* \* \* \*

UNITED STATES PATENT AND TRADEMARK OFFICE
CERTIFICATE OF CORRECTION

| | | |
|---|---|---|
| PATENT NO. | : 8,680,978 B2 | Page 1 of 1 |
| APPLICATION NO. | : 13/122077 | |
| DATED | : March 25, 2014 | |
| INVENTOR(S) | : Yiwen Yang et al. | |

It is certified that error appears in the above-identified patent and that said Letters Patent is hereby corrected as shown below:

In the Claims

In column 7, lines 12-15 should be corrected to read:

>a viewing direction of the driver of the first vehicle is
>inferred on the basis image data of an image-sensing
>unit of the first vehicle, and Additionally, in column 7, lines 34-35 should be corrected to read:

>a first interface for receiving a warning signal and position
>data from a second vehicle;

Signed and Sealed this
Eighth Day of July, 2014

Michelle K. Lee
*Deputy Director of the United States Patent and Trademark Office*